(12) United States Patent
Rosal et al.

(10) Patent No.: US 8,241,556 B2
(45) Date of Patent: Aug. 14, 2012

(54) ROTARY HOLDING DEVICE FOR GRIPPING TOOL MATERIAL AT ELEVATED TEMPERATURES THROUGH MULTIPLE COLLAR ASSEMBLY

(75) Inventors: David Rosal, West Bountiful, UT (US); Scott M. Packer, Alpine, UT (US); Russell J. Steel, Salem, UT (US); Peter Cariveau, Draper, UT (US); John Williams, Alpine, UT (US); Lance Richman, Payson, UT (US)

(73) Assignee: Megastir Technologies LLC, Provo, UT (US)

( * ) Notice: Subject to any disclaimer, the term of this patent is extended or adjusted under 35 U.S.C. 154(b) by 344 days.

(21) Appl. No.: 12/583,005

(22) Filed: Aug. 11, 2009

(65) Prior Publication Data
US 2010/0038832 A1    Feb. 18, 2010

Related U.S. Application Data

(60) Provisional application No. 61/087,916, filed on Aug. 11, 2008.

(51) Int. Cl.
*B23K 20/12* (2006.01)

(52) U.S. Cl. .................................. 266/274; 228/112.1
(58) Field of Classification Search ................ 266/274; 228/112.1
See application file for complete search history.

(56) References Cited

U.S. PATENT DOCUMENTS

| 6,648,206 B2 * | 11/2003 | Nelson et al. ............. 228/112.1 |
| 2006/0043152 A1 | 3/2006 | Stol et al. |
| 2006/0157531 A1 | 7/2006 | Packer et al. |
| 2006/0169740 A1 | 8/2006 | Fukuhara et al. |
| 2007/0102492 A1 | 5/2007 | Nelson et al. |

* cited by examiner

*Primary Examiner* — Scott Kastler
(74) *Attorney, Agent, or Firm* — Morris O'Bryant Compagni, PC (57) ABSTRACT

A tool is provided that is capable of friction stir processing, friction stir mixing, and friction stir welding of high melting temperature and low melting temperature materials, wherein the collar is now divided into at least an inner and an outer collar coupled to the shank and the FSW tip, wherein new thermal barriers enable expansion of the inner collar to be directed inward to thereby create compression on the FSW tip instead of allowing the FSW tip to become loose in the tool at elevated temperatures.

17 Claims, 7 Drawing Sheets

ROTARY HOLDING DEVICE FOR GRIPPING TOOL MATERIAL AT ELEVATED TEMPERATURES THROUGH MULTIPLE COLLAR ASSEMBLY

RELATED APPLICATIONS

This application claims priority to and incorporates by reference all of the subject matter of U.S. Provisional Patent Application Ser. No. 61/087,916, filed Aug. 11, 2008.

BACKGROUND OF THE INVENTION

1. Field of the Invention

This invention relates generally to friction stir welding (FSW) and all of its variations including friction stir processing (FSP), friction stir mixing (FSM) and friction stir spot welding (FSSW) (and hereinafter referred to collectively as "friction stir welding"). Specifically, the invention relates to the problem of tool failure when excessive heat is generated when the tool is used on high melting temperature materials, wherein a collar is used to transfer torque from a rotating shank to a FSW tip, and collar failure results in failure of the FSW tip.

2. Background of the Problems Being Solved

Friction stir welding is a technology that has been developed for welding metals and metal alloys. The FSW process often involves engaging the material of two adjoining workpieces on either side of a joint by a rotating stir pin. Force is exerted to urge the pin and the workpieces together and frictional heating caused by the interaction between the pin, shoulder and the workpieces results in plasticization of the material on either side of the joint. The pin and shoulder combination or "FSW tip" is traversed along the joint, plasticizing material as it advances, and the plasticized material left in the wake of the advancing FSW tip cools to form a weld. The FSW tip can also be a tool without a pin and only a shoulder for processing of another material through FSP.

Figure 1:
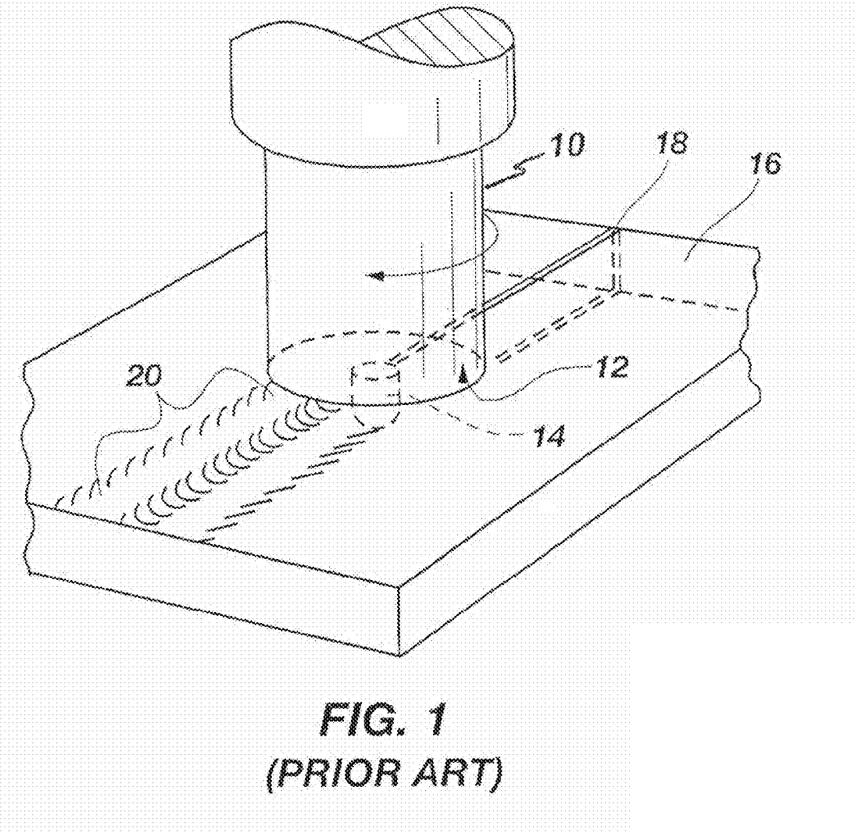
FIG. 1 is a perspective view of a tool as taught in the prior art for friction stir welding.

FIG. 1 is a perspective view of a tool being used for friction stir welding that is characterized by a generally cylindrical tool 10 having a shank 8, a shoulder 12 and a pin 14 extending outward from the shoulder. The pin 14 is rotated against a workpiece 16 until sufficient heat is generated, at which point the pin of the tool is plunged into the plasticized workpiece material. Typically, the pin 14 is plunged into the workpiece 16 until reaching the shoulder 12 which prevents further penetration into the workpiece. The workpiece 16 is often two sheets or plates of material that are butted together at a joint line 18. In this example, the pin 14 is plunged into the workpiece 16 at the joint line 18.

Figure 2:
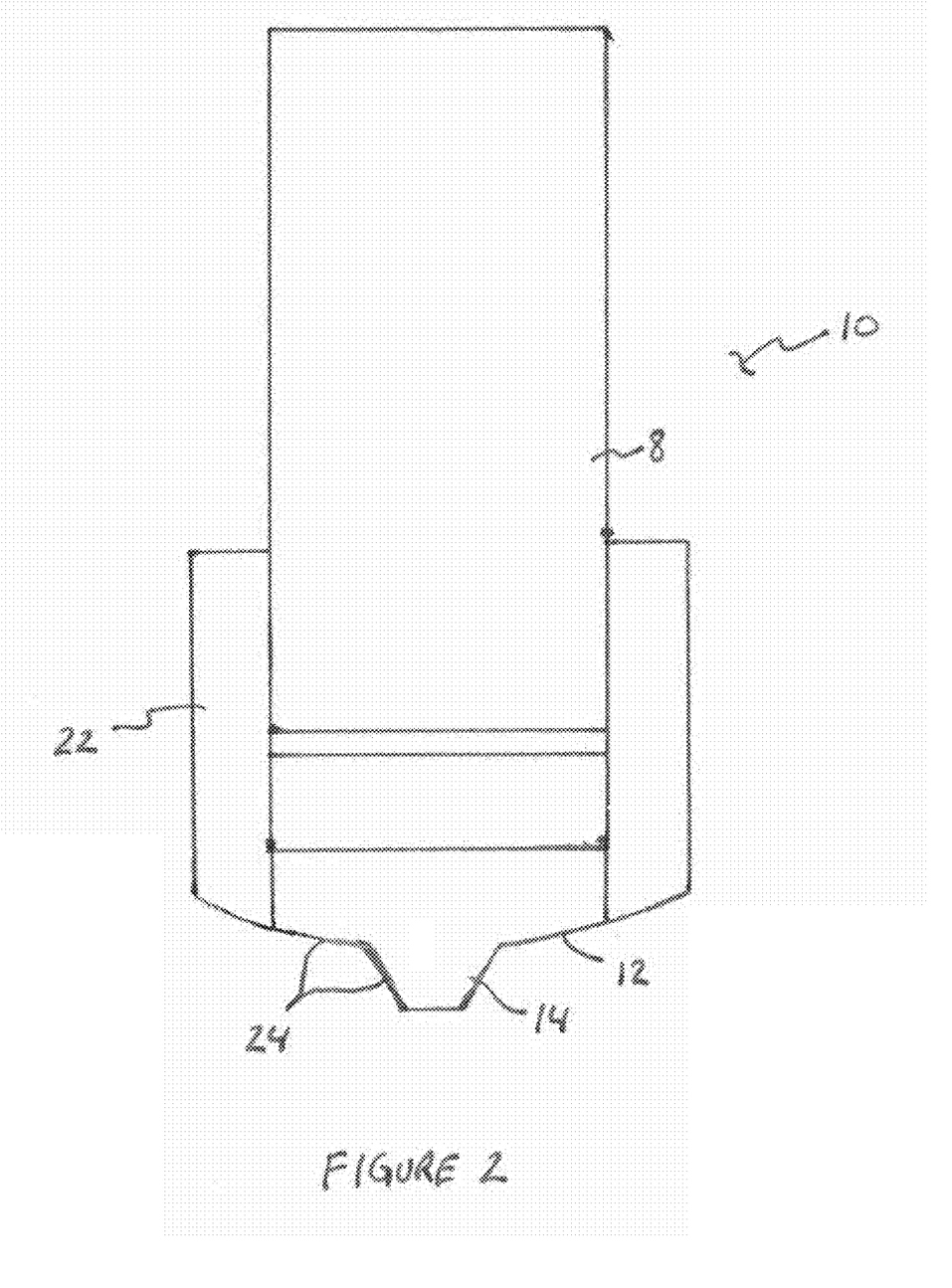
FIG. 2 is a cut-away profile view of an FSW tip, a locking collar and a shank from the prior art.

FIG. 2 is a cross-sectional view of the tool 10. A collar 22 is shown gripping both the shank 8 and the FSW tip 24, wherein the FSW tip is comprised of the shoulder 12 and the pin 14. As the tool 10 is rotated, torque is transmitted from the rotating shank 8 to the collar 22 and then to the FSW tip 24. When the tool 10 is being used on a workpiece that is a high melting temperature material such as steel, the FSW tip 24 is in many situations exposed to temperatures in excess of 1000 degrees C. as it is rotated while traversing steel softened by frictional heating.

Previous state of the art designs that use a collar on a tool for FSW or on a tool in the metal cutting industry use a single collar shrink-fit assembly. In the metal cutting industry such a tool is used for operation of high speed/high stiffness rotary cutting assemblies. The tool in the metal cutting industry relies on a collar that loosens and allows the tool to slip at elevated temperatures so that tool replacement is convenient. Accordingly, prior art designs do not manage the thermal expansion of the collar assembly in order to properly hold the tool above 400 degrees Celsius. The bi-material system of the tools is designed to have a higher thermal expansion rate for the outer collar material, but only for the purpose of easier tool replacement.

Referring to FIG. 1, the frictional heat caused by rotational motion of the pin 14 against the workpiece material 16 causes the workpiece material to soften without reaching a melting point. The tool 10 is moved transversely along the joint line 18, thereby creating a weld as the plasticized material flows around the pin from a leading edge to a trailing edge. The result is a solid phase bond 20 at the joint line 18 that may be generally indistinguishable from the workpiece material 16 itself, in contrast to welds using other conventional technologies.

It is observed that when the shoulder 12 contacts the surface of the workpieces, its rotation creates additional frictional heat that plasticizes a larger cylindrical column of material around the inserted pin 14. The shoulder 12 provides a forging force that contains the upward metal flow caused by the tool pin 14.

During friction stir welding, the area to be welded and the tool are moved relative to each other such that the tool traverses a desired length of the weld joint. The rotating friction stir welding tool 10 provides a continual hot working action, plasticizing metal within a narrow zone as it moves transversely along the base metal, while transporting metal from the leading edge of the pin 14 to its trailing edge. As the weld zone cools, there is typically no solidification as no liquid is created as the tool 10 passes. It is often the case, but not always, that the resulting weld is a defect-free, recrystallized, fine grain microstructure formed in the area of the weld.

Travel speeds are typically 10 to 500 mm/min with rotation rates of 200 to 2000 rpm. Temperatures reached are usually close to, but below, solidus temperatures. Friction stir welding parameters are a function of a material's thermal properties, high temperature flow stress and penetration depth.

Friction stir welding has several advantages over fusion welding because 1) there is no filler metal, 2) the process can be fully automated requiring a relatively low operator skill level, 3) the energy input is efficient as all heating occurs at the tool/workpiece interface, 4) minimum post-weld inspection is required due to the solid state nature and extreme repeatability of FSW, 5) FSW is tolerant to interface gaps and as such little pre-weld preparation is required, 6) there is no weld spatter to remove, 7) the post-weld surface finish can be exceptionally smooth with very little to no flash, 8) there is no porosity and oxygen contamination, 9) there is little or no distortion of surrounding material, 10) no operator protection is required as there are no harmful emissions, and 11) weld properties are improved. Throughout this document, friction stir welding will be considered to include all processes that can be performed using a friction stir welding tool, including friction stir processing and friction stir mixing.

Previous patent documents have taught the benefits of being able to perform friction stir welding with materials that were previously considered to be functionally unweldable. Some of these materials are non-fusion weldable, or just difficult to weld at all. These materials include, for example, metal matrix composites, ferrous alloys such as steel and stainless steel and non-ferrous materials. Another class of materials that were also able to take advantage of friction stir welding is the superalloys. Superalloys can be materials having a higher melting temperature bronze or aluminum, and may have other elements mixed in as well. Some examples of superalloys are nickel, iron-nickel, and cobalt-based alloys generally used at temperatures above 1000 degrees F. Additional elements commonly found in superalloys include, but are not limited to, chromium, molybdenum, tungsten, aluminum, titanium, niobium, tantalum, and rhenium.

It is noted that titanium is also a desirable material to friction stir weld. Titanium is a non-ferrous material, but has a higher melting point than other nonferrous materials.

The previous patents teach that a tool for friction stir welding of high temperature materials is made of a material or materials that have a higher melting temperature than the material being friction stir welded. In some embodiments, a superabrasive was used in the tool, sometimes as a coating.

The embodiments of the present invention are generally concerned with these functionally unweldable materials, as well as the superalloys, and are hereinafter referred to as "high melting temperature" materials throughout this document. Nevertheless, the tool to be taught herein can also be used in less harsh friction stir welding environments when low melting temperature materials are being used.

The present invention is useful for tools being used in many applications, but most especially when performing friction stir processing of high melting temperature materials. Piping and tubing applications require mechanically fastened connectors, often made of dissimilar materials, to maintain a seal over a wide temperature range. As a result, the joint is prone to leaking due to extreme temperature gradients as the two materials expand or contract at different rates. Piping and tubing systems that transport liquid natural gas are one example of mechanical components that must function over an extreme temperature range.

Equipment and machinery having components that operate at elevated temperatures often have rotating components that drive torque to other components. Even when these components are made from materials designed to have high strength at high temperatures, failure of these components during operation can be hazardous and costly. Failure results when components have lowered fatigue resistance and/or reduced creep and rupture strength at these elevated temperatures. In addition, the loads applied to the materials are generally near the yield, fatigue and creep strength of these materials. An example of this problem is a friction stir welding tool used to join high temperature materials such as steels, stainless steels and nickel base alloys, and other high melting temperature materials.

High Temperature Friction Stir Welding Tool

In conjunction with the problems associated with the creation of materials that require liquid to solid phase transformation, recent advancements in friction stir welding technologies have resulted in tools that can be used to join high melting temperature materials such as steel and stainless steel together during the solid state joining processes of friction stir welding.

When this tool is used it is effective at friction stir welding of various materials. This tool design is also effective when using a variety of tool tip materials besides polycrystalline cubic boron nitride (PCBN) and polycrystalline diamond (PCD). Some of these materials include refractories such as tungsten, rhenium, iridium, titanium, molybdenum, etc.

Because these FSW tip materials are often expensive to produce, a design having a replaceable FSW tip is an economical way of producing and providing tools to the market because they can be replaced when worn or fractured.

When the FSW tip 24 is comprised of PCBN, the FSW tip is comprised of a ceramic-like material that has a low coefficient of thermal expansion relative to the collar which is sometimes made from a nickel base superalloy. Because of the high cost of PCBN and other materials capable of withstanding the environment of friction stir welding, it is cost effective to minimize the length of the FSW tip 24.

As the shank 8 rotates and plunges the FSW tip 24 into the surface of the material being friction stir welded, heat is generated and transferred to the collar 22. The collar 22 expands more than the PCBN FSW tip 24, becomes loose, and allows the FSW tip 24 to rotate within the collar during friction stir welding. Even though the shank 8 is typically cooled during friction stir welding, the expansion of the collar 22 cannot be reduced or eliminated with this type of prior art collar design. High strength materials that have less thermal expansion and greater toughness than PCBN have not been found, and therefore there is no substitute material that can eliminate the collar 22 expansion problem. Accordingly, the FSW tip 24 is prone to move and spin on the end of the shank 8 as the torque required to drive the FSW tip 24 exceeds the strength of the thermally expanded collar 8.

The result is failure of the FSW tip 24 and friction stir welding must be halted to replace the tool 10. A repair procedure must also be used to remove any FSW tip 24 debris in the materials being joined. In some cases, repair procedures cannot be utilized and the workpiece must be scrapped.

The root problem of collar expansion and tool failure is a result of unfavorable expansion or contraction of key components as they interact with mating components. It would be an improvement over state of the art collar designs to provide a tool that could withstand the high temperature of friction stir welding without having FSW tip 24 failure caused by collar expansion.

BRIEF SUMMARY OF THE INVENTION

It is one aspect of the present invention to provide a new tool for friction stir welding that eliminates the problem caused by expansion of the collar.

It is another aspect of the invention to create favorable stresses within the tool that are facilitated and not undermined by collar expansion.

It is another aspect of the invention to provide thermal management to achieve improved gripping of a collar at elevated tool temperatures.

In various embodiments of the present invention, a tool is provided that is capable of friction stir processing, friction stir mixing, friction stir spot welding and friction stir welding of high melting temperature and low melting temperature materials, wherein the collar is now divided into at least an inner and an outer collar coupled to the shank and the FSW tip, wherein new thermal barriers enable expansion of the inner collar to be directed inward to thereby create compression on the FSW tip instead of allowing the FSW tip to become loose in the tool at elevated temperatures.

These and other aspects, features and advantages of the present invention will become apparent to those skilled in the art from a consideration of the following detailed description taken in combination with the accompanying drawings.

DETAILED DESCRIPTION OF THE INVENTION

Reference will now be made to the drawings in which the various elements of embodiments of the present invention will be given numerical designations and in which the invention will be discussed so as to enable one skilled in the art to make and use the embodiments. It is to be understood that the following description is only exemplary of the principles of the present invention, and should not be viewed as narrowing the claims which follow.

The present invention as explained hereinafter will apply to several different classes of materials. In one embodiment, the materials may be considered to be those materials that have melting temperatures higher than bronze and aluminum as previously disclosed. This class of materials includes, but is not limited to, metal matrix composites, ferrous alloys such as steel and stainless steel, non-ferrous materials, superalloys, titanium, cobalt alloys typically used for hard-facing, and air-hardened or high-speed steels. In another embodiment, the materials may be considered to be all other lower melting temperature materials that are not included within the definition of the higher melting temperatures described above.

Figure 3:
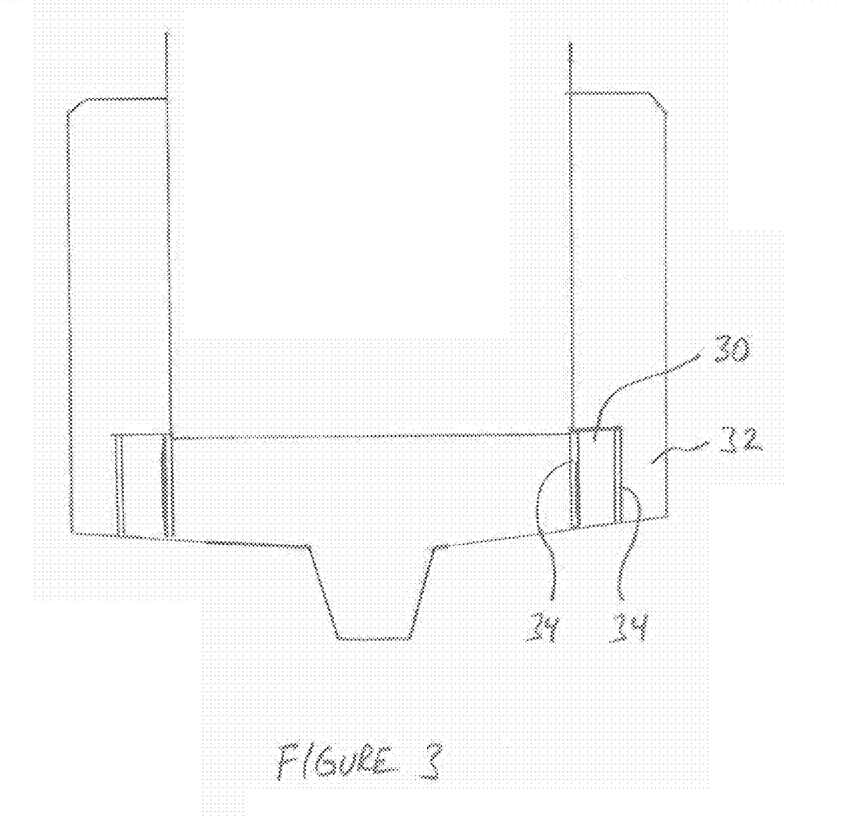
FIG. 3 is a cut-away profile view of a first embodiment of the present invention.

A first embodiment of the present invention is a new tool 10 that is used to perform friction stir welding as shown in FIG. 3. The present invention reverses the direction of the expansion or contraction of a first component with its mating component to create favorable stresses within the assembly. FIG. 3 shows the first embodiment of how this is achieved.

In this side profile cut-away view of the tool 10, an inner collar 30 is placed inside an outer collar 32. A first thermal barrier 34 is disposed between the FSW tip 24 and the inner collar 30. A second thermal barrier 36 is disposed between the inner collar 30 and the outer collar 32.

The first and second thermal barriers are comprised of materials that inhibit the transfer of thermal energy from one side of the barrier to the other side. Different materials will have different coefficients of thermal expansion. Thus, different materials can be used for the different thermal barriers to thereby change the temperature gradients across the different components of the tool 10.

As the PCBN material of the FSW tip 24 increases in temperature, a portion of heat is transferred through the first thermal barrier 34 to the inner collar 30. The first thermal barrier 34 creates a temperature gradient in the inner collar 30 so it remains cooler than the FSW tip 24. As the heat continues to transfer, another temperature gradient is applied to the outer collar 32 as the heat crosses through the second thermal barrier 36. The outer collar 32 is now cooler than the inner collar 30 and as a result, the outer collar has less thermal expansion than the inner collar.

The inner collar 30 cannot expand outwardly because of the presence of the outer collar 32. Accordingly, the expansion of the inner collar 30 is now directed inwards, back towards the FSW tip 24. This expansion of the inner collar 30 creates compression on the FSW tip 24. Depending on the design of the tool 10, it may be necessary to minimize the compression caused by the inner collar 30 on the FSW tip 24.

Figure 4:
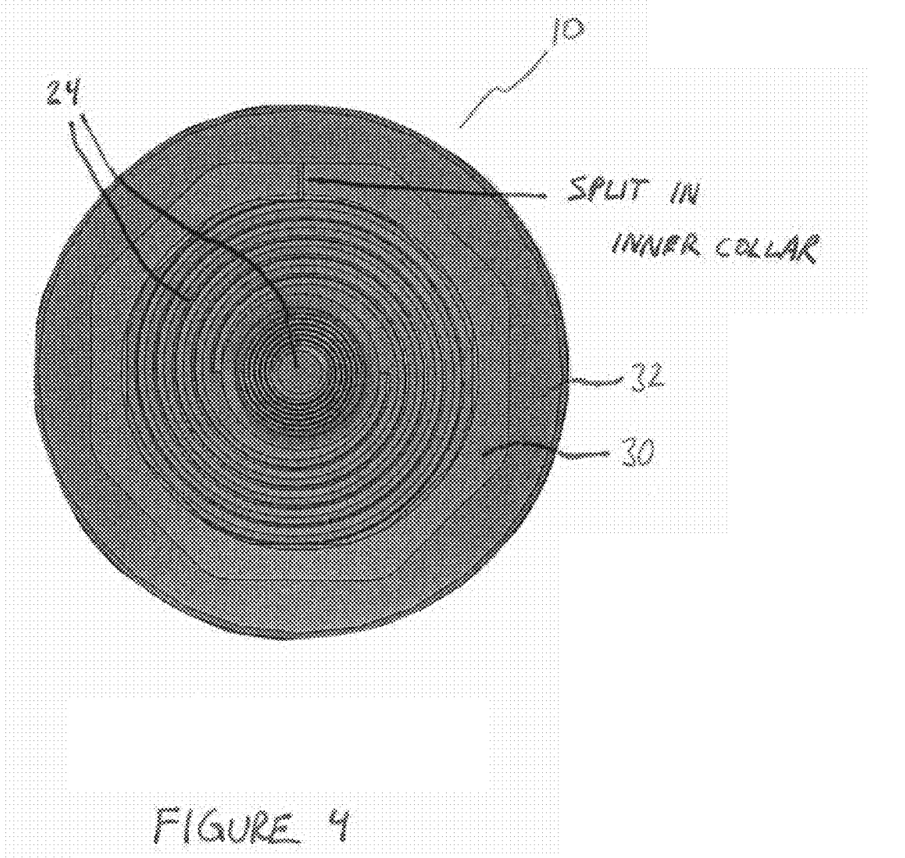
FIG. 4 is an end view of an alternative embodiment showing a tool that includes a gap in the inner collar to control compression.

FIG. 4 is provided to illustrate a first method of reducing compression by the inner collar 30. Reduced compression is accomplished by splitting the inner collar 30 and creating a gap 40. The gap 40 provides a space for expansion of the inner collar 30, thereby reducing the applied compressive stress to the FSW tip 24.

Figure 5:
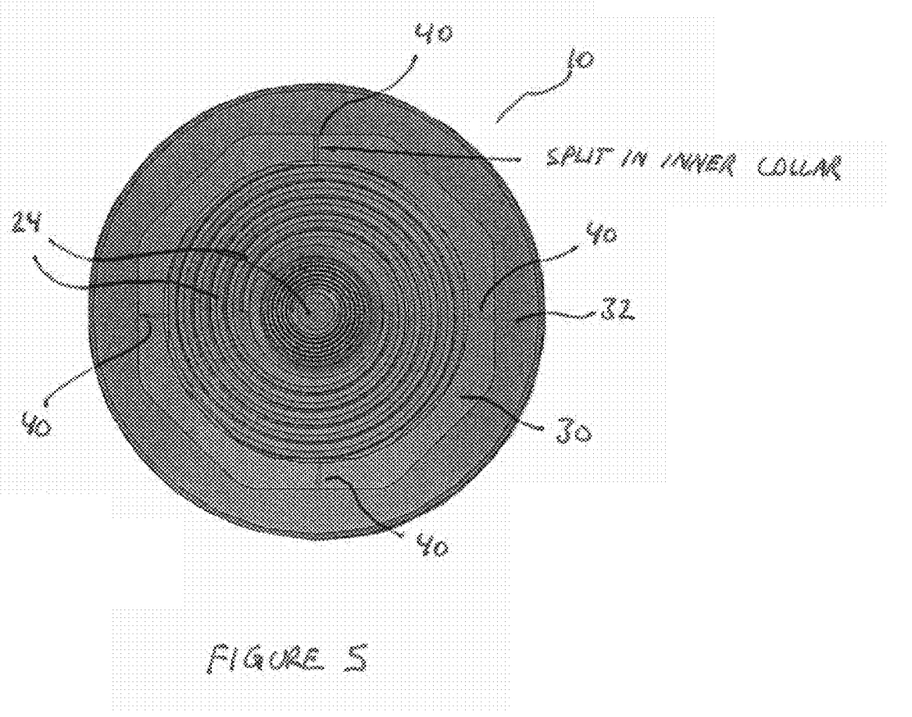
FIG. 5 is an end view of another alternative embodiment showing a tool that includes multiples splits and gaps.

In an alternative embodiment shown in FIG. 5, multiple splits and gaps 40 can be made in the inner collar 30. Multiple splits and gaps 40 enable the present invention to compensate for different materials used for the inner collar 30 and the outer collar 32, the FSW tip 24, and the thermal barriers. The specific number and placement of the splits and gaps 40 can vary, and should not be considered limited by the example shown in FIG. 5.

Another embodiment of the present invention is the application of heat to the inner collar 30. The application of heat would be by some means other than rotation of the tool 10. For example, a resistive element could be used in the tool 10 to heat the inner collar 30. Heating the inner collar would force the inner collar 30 to expand inwards and apply compression to the FSW tip 24.

Another aspect of the present invention applies to modification of the temperature gradient across all components of the tool 10. For example, the temperature gradient across the FSW tip 24, the inner collar 30 and the outer collar 32 could be modified by means other than rotation of the tool 10 against a workpiece. Means for modifying the temperature gradient include but should not be considered to the limited to active cooling, passive cooling such as cooling fins, the use of dissimilar materials in the inner collar and the outer collar and the use of interference fits.

Some examples include cooling fins can be added to the outside diameter of a collar. Multiple collars manage temperature gradients by manipulating thermal conductivity of collars, possibly with the assistance of thermal barrier coatings. Split-ring collars or removal of material from selected zones can be used to manipulate the compression applied between the collars. Active and/or passive cooling can be applied to portions of the tool to also affect temperature gradients.

Another alternative embodiment of the present invention is the use of an inner collar and an outer collar without thermal barriers between the various components of the tool 10. By making the inner and outer collars from different materials with different coefficients of thermal expansion, the inner collar can still be used to create compression on the FSW tip if the inner collar expands more than the outer collar.

Figure 6:
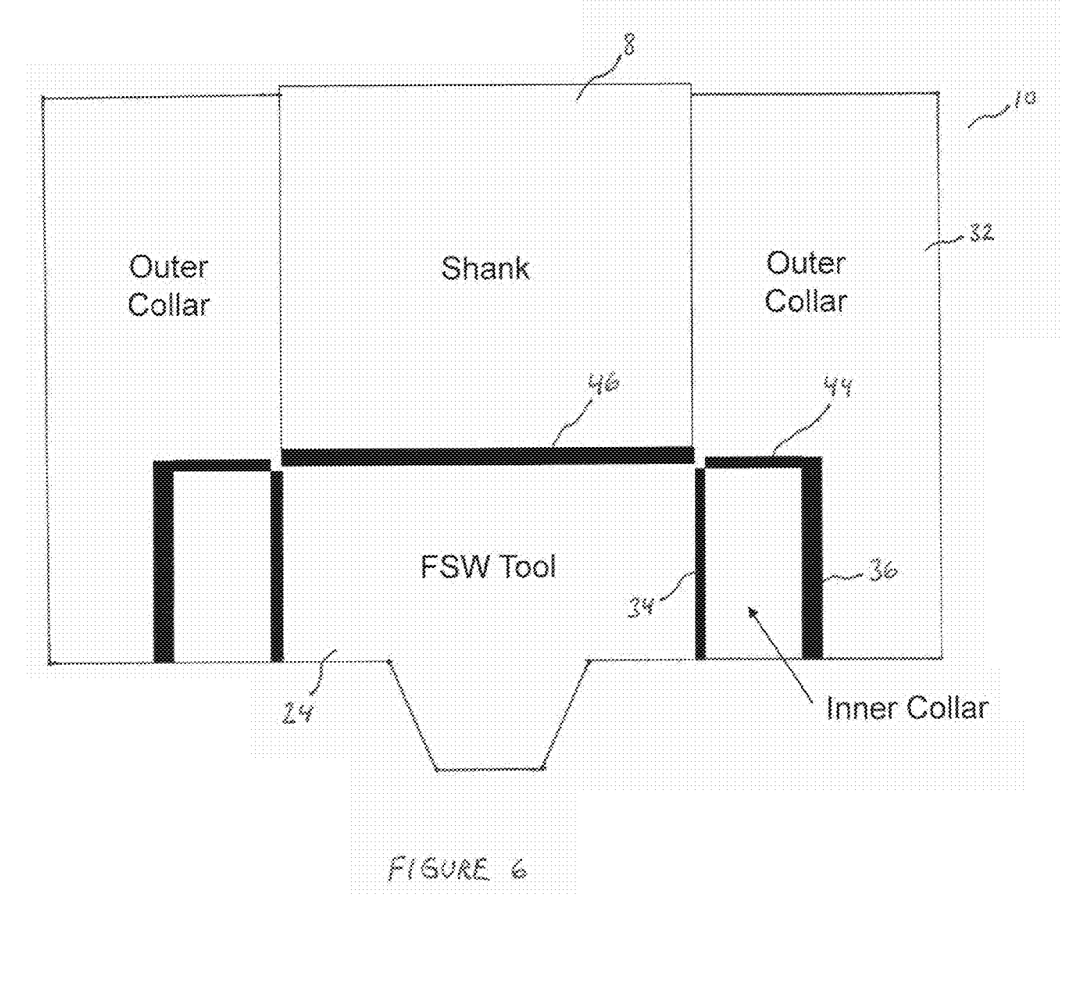
FIG. 6 is a cut-away profile view of another alternative embodiment of the present invention that includes additional thermal barriers.

An alternative embodiment of the invention is shown in FIG. 6. In FIG. 6, other locations are indicated where a thermal barrier can be disposed in the tool 10 to assist in the creation of thermal gradients where needed. The locations of the first thermal barrier 34 and the second thermal barrier 36 are the same as indicated. However, a third thermal barrier 44 is shown as being disposed between the inner collar 30 and the outer collar 32. A fourth thermal barrier 46 is shown disposed between the FSW tip 24 and the shank 8.

Figure 7:
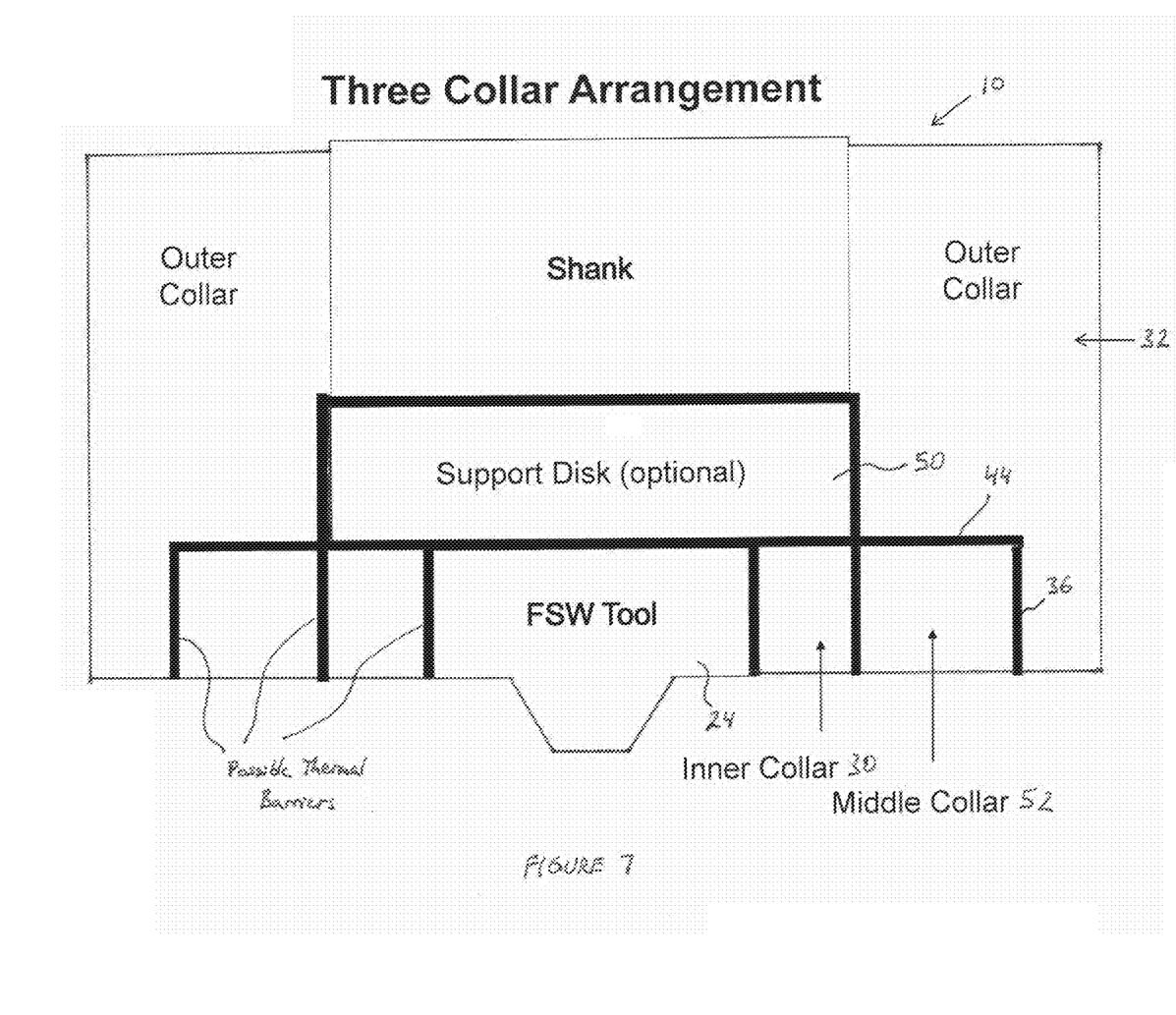
FIG. 7 is a cut-away profile view of another alternative embodiment of the present invention that includes an optional support disk and an additional collar in the collar assembly.

In another alternative embodiment shown in FIG. 7, two new components are added to the tool 10. These new components can be added together or individually, and do not require the presence of the other.

The first new component is a support disk 50 that is disposed between the shank 8 and the FSW tip 24. This support disk 50 is optional, and serves various purposes as known to those skilled in the art. For example, the support disk 50 can serve to cushion the FSW tip 24 so that there is no damaging contact between the FSW tip and the shank 8.

The second new component is a middle collar 52 disposed between the outer collar 32 and the inner collar 30. The purpose of the middle collar 52 is to create another temperature gradient and thereby modify the degree of compression by the inner collar 30 on the FSW tip 24.

The addition of the middle collar 52 leaves open the possibility of adding additional collars. The number of collars that can be added is only limited by the space available. Likewise, the number of thermal barriers that can be used is also unlimited. In other words, thermal barriers can also be layered. Thermal barriers can be disposed against other thermal barriers, against a thermal barrier and a component of the tool 10, or just between components.

FIG. 7 also shows the locations that thermal barriers can be disposed within the tool 10 to adjust the temperature gradient therein.

It is to be understood that the above-described arrangements and embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A system for providing a friction stir welding tool that shows improved performance at elevated temperatures, said system comprised of:
   a cylindrical shank;
   a cylindrical friction stir welding (FSW) tip disposed on a working end of the shank;
   an inner collar engaged around a portion of the FSW tip; and
   an outer collar engaged around the inner collar and at least a portion of the shank, to thereby cause the inner collar to compress inward against the FSW tip when the inner collar expands from heating, wherein the inner collar is comprised of a first material that expands at a higher rate than will a second material used in the outer collar.

2. The system as defined in claim 1 wherein the system is further comprised of at least one thermal barrier that creates a thermal gradient in the inner collar.

3. The system as defined in claim 2 wherein the system is further comprised of a first thermal barrier disposed between the FSW tip and the inner collar.

4. The system as defined in claim 3 wherein the system is further comprised of a second thermal barrier disposed between the inner collar and the outer collar.

5. The system as defined in claim 1 wherein the system is further comprised of at least one gap through the inner collar, wherein the at least one gap reduces compression of the inner collar on the FSW tip.

6. The system as defined in claim 1 wherein the system is further comprised of means for cooling the outer collar such that the outer collar will expand slower than the inner collar due to heating.

7. The system as defined in claim 6 wherein the means for cooling the outer collar is selected from the group of cooling means comprised of active cooling and passive cooling.

8. The system as defined in claim 1 wherein the system is further comprised of a heating element coupled to the inner collar to thereby enable heating of the inner collar to facilitate compression of the inner collar on the FSW tip.

9. The system as defined in claim 1 wherein the system is further comprised of at least one additional collar disposed between the inner collar and the outer collar, wherein the at least one additional collar functions as a thermal barrier to increase a temperature gradient between the inner collar and the outer collar.

10. A method for providing improved performance at elevated temperatures of a friction stir welding tool, said method comprising the steps of:
   1) providing a cylindrical shank, a cylindrical friction stir welding (FSW) tip disposed on a working end of the shank, an inner collar engaged around a portion of the FSW tip, and an outer collar engaged around the inner collar and at least a portion of the shank; and
   2) applying a compressive force from the inner collar against the FSW tip when the inner collar expands from heating, wherein the inner collar is comprised of a first material that expands at a higher rate than will a second material used in the outer collar.

11. The method as defined in claim 10 wherein the method further comprises the step of providing thermal barriers that assist in the creation of thermal gradients in the inner collar.

12. The method as defined in claim 11 wherein the method further comprises the step of disposing a first thermal barrier disposed between the FSW tip and the inner collar.

13. The method as defined in claim 12 wherein the method further comprises the step of disposing a second thermal barrier between the inner collar and the outer collar.

14. The method as defined in claim 10 wherein the method further comprises the step of disposing at least one gap through the inner collar, wherein the at least one gap reduces compression of the inner collar on the FSW tip.

15. The method as defined in claim 10 wherein the method further comprises the step of cooling the outer collar such that the outer collar will expand slower than the inner collar due to heating.

16. The method as defined in claim 10 wherein the method further comprises the step of disposing a heating element adjacent to the inner collar to thereby enable heating of the inner collar to facilitate compression of the inner collar on the FSW tip.

17. The method as defined in claim 10 wherein the method further comprises the step of disposing at least one additional collar between the inner collar and the outer collar, wherein the at least one additional collar functions as a thermal barrier to increase a temperature gradient between the inner collar and the outer collar.

* * * * *